(12) United States Patent
Radeczky et al.

(10) Patent No.: US 10,612,485 B2
(45) Date of Patent: Apr. 7, 2020

(54) SENSOR WITH A PIEZO-ACTUATOR

(71) Applicant: Continental Automotive GmbH, Hannover (DE)

(72) Inventors: Janos Radeczky, Wenzenbach (DE); Matthias Scheid, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/096,354

(22) PCT Filed: Mar. 9, 2017

(86) PCT No.: PCT/EP2017/055611
§ 371 (c)(1),
(2) Date: Oct. 25, 2018

(87) PCT Pub. No.: WO2017/186396
PCT Pub. Date: Nov. 2, 2017

(65) Prior Publication Data
US 2019/0128202 A1 May 2, 2019

(30) Foreign Application Priority Data

Apr. 25, 2016 (DE) .................. 10 2016 206 997

(51) Int. Cl.
*F02M 1/00* (2006.01)
*F02D 41/20* (2006.01)
(Continued)

(52) U.S. Cl.
CPC ....... *F02D 41/2096* (2013.01); *F02D 41/402* (2013.01); *F02M 51/0603* (2013.01);
(Continued)

(58) Field of Classification Search
CPC ......... F02D 41/3845; F02D 2200/0602; F02D 41/20; F02D 41/2096; F02M 63/0026
(Continued)

(56) References Cited

U.S. PATENT DOCUMENTS 6,499,464 B2 * 12/2002 Rueger ............... F02D 41/2096
123/446
7,721,716 B1 * 5/2010 Harwood ............. F02M 57/027
123/495
(Continued)

FOREIGN PATENT DOCUMENTS

DE 10 2008 023 373 A1 11/2009 ............. F02D 41/20
DE 10 2011 005 285 A1 9/2012 ............. F02D 41/00
(Continued)

OTHER PUBLICATIONS

German Office Action, Application No. 10 2016 206 997.7, 7 pages.
(Continued)

*Primary Examiner* — John Kwon
(74) *Attorney, Agent, or Firm* — Slayden Grubert Beard PLLC

(57) ABSTRACT

Various embodiments may include a method for operating a piezo-actuator in a piezo-operated injector for a fuel injection system comprising: producing a measuring pulse at a position at which the usable signal which is to be measured is expected; then producing a reference pulse which corresponds to the measuring pulse, in the same cycle; subtracting a first actuator voltage measured during the reference pulse from a second actuator voltage measured during the measuring pulse; using a resulting voltage signal difference to calculate a force sensed by the piezo-actuator; and using the force sensed to correct an injection amount for the injector.

6 Claims, 3 Drawing Sheets

(51) Int. Cl.
  *F02M 57/00* (2006.01)
  *F02D 41/40* (2006.01)
  *F02M 51/06* (2006.01)
  *F02D 41/28* (2006.01)

(52) U.S. Cl.
  CPC ... *F02M 57/005* (2013.01); *F02D 2041/2055* (2013.01); *F02D 2041/286* (2013.01); *Y02T 10/44* (2013.01)

(58) Field of Classification Search
  USPC ....... 123/446, 472, 478, 480, 490, 495, 498; 701/101, 104; 310/316, 317
  See application file for complete search history.

(56) References Cited

U.S. PATENT DOCUMENTS

| | | | | |
|---|---|---|---|---|
| 7,965,072 B2 * | 6/2011 | Schmau | ................ | H02N 2/067 323/312 |
| 2002/0046734 A1 | 4/2002 | Rueger | ......................... | 123/446 |
| 2011/0120423 A1 | 5/2011 | Borchsenius et al. | ........ | 123/494 |
| 2012/0305666 A1 * | 12/2012 | Harwood | ........... | F02M 51/0603 239/102.2 |
| 2013/0066538 A1 * | 3/2013 | Brandt | ................ | F02D 41/2096 701/105 |
| 2013/0104636 A1 | 5/2013 | Beer et al. | .................. | 73/114.49 |
| 2014/0034747 A1 | 2/2014 | Wiehoff et al. | .................... | 239/5 |
| 2014/0060488 A1 | 3/2014 | Katzenberger et al. | ...... | 123/456 |
| 2015/0027415 A1 * | 1/2015 | Radeczky | ........... | F02D 41/2096 123/480 |

FOREIGN PATENT DOCUMENTS

| | | | | |
|---|---|---|---|---|
| DE | 10 2011 007 393 B3 | 9/2012 | ............. | F02D 41/00 |
| DE | 10 2011 016 168 A1 | 10/2012 | ............. | F02M 61/16 |
| DE | 10 2010 018 290 B4 | 3/2016 | ............. | F02D 41/20 |
| WO | 2017/186396 A1 | 11/2017 | | |

OTHER PUBLICATIONS

International Search Report and Written Opinion, Application No. PCT/EP2017/055611, 19 pages.

* cited by examiner

SENSOR WITH A PIEZO-ACTUATOR

CROSS-REFERENCE TO RELATED APPLICATIONS

This application is a U.S. National Stage Application of International Application No. PCT/EP2017/055611 filed Mar. 9, 2017, which designates the United States of America, and claims priority to DE Application No. 10 2016 206 997.7 filed Apr. 25, 2016, the contents of which are hereby incorporated by reference in their entirety.

TECHNICAL FIELD

The present disclosure relates to motor vehicles and sensors. Various embodiments may include a method for operating a piezo-actuator as a sensor in a piezo-operated injector, in particular diesel-common-rail injector.

BACKGROUND

A standard injector, in particular diesel-common-rail injector, has an actuator which activates a nozzle needle directly or indirectly (under servo operation). The piezo-element used as an actuator can also be used as a sensor in order to detect characteristic events, such as, for example, the closing time of the nozzle needle. This information can be used to control the injector and improve the accuracy of the injections.

SUMMARY

As an example, some embodiments may include a method for operating a piezo-actuator as a sensor in a piezo-operated injector, in which by partially charging a piezo-actuator the air gap between the piezo-actuator and a servo valve is eliminated, having the following steps: producing a measuring pulse at a position at which the usable signal which is to be measured is expected; then producing a reference pulse which corresponds to the measuring pulse, in the same cycle; subtracting the actuator voltage measured during the reference pulse from the actuator voltage measured during the measuring pulse; and using the voltage signal difference as a usable signal for the measurement of force by the piezo-actuator which operates as a sensor.

In some embodiments, the measuring pulse is generated in order to produce a usable signal which represents the force or change in force acting on the servo valve as a result of the pressure or a change in the pressure in the fuel chamber.

In some embodiments, the signal correction which is carried out is adapted dynamically to the respective operating point.

In some embodiments, the measuring pulse is generated in order to detect the closing of the nozzle needle during a main injection.

In some embodiments, digital signal processing is carried out after the measurement.

As another example, some embodiments may include a motor vehicle, characterized in that it has a control unit which is designed to carry out the method as described above.

BRIEF DESCRIPTION OF THE DRAWINGS

The teachings herein are explained in detail below with reference to an exemplary embodiment in connection with the drawing. In the drawings.

DETAILED DESCRIPTION

Figure 1:
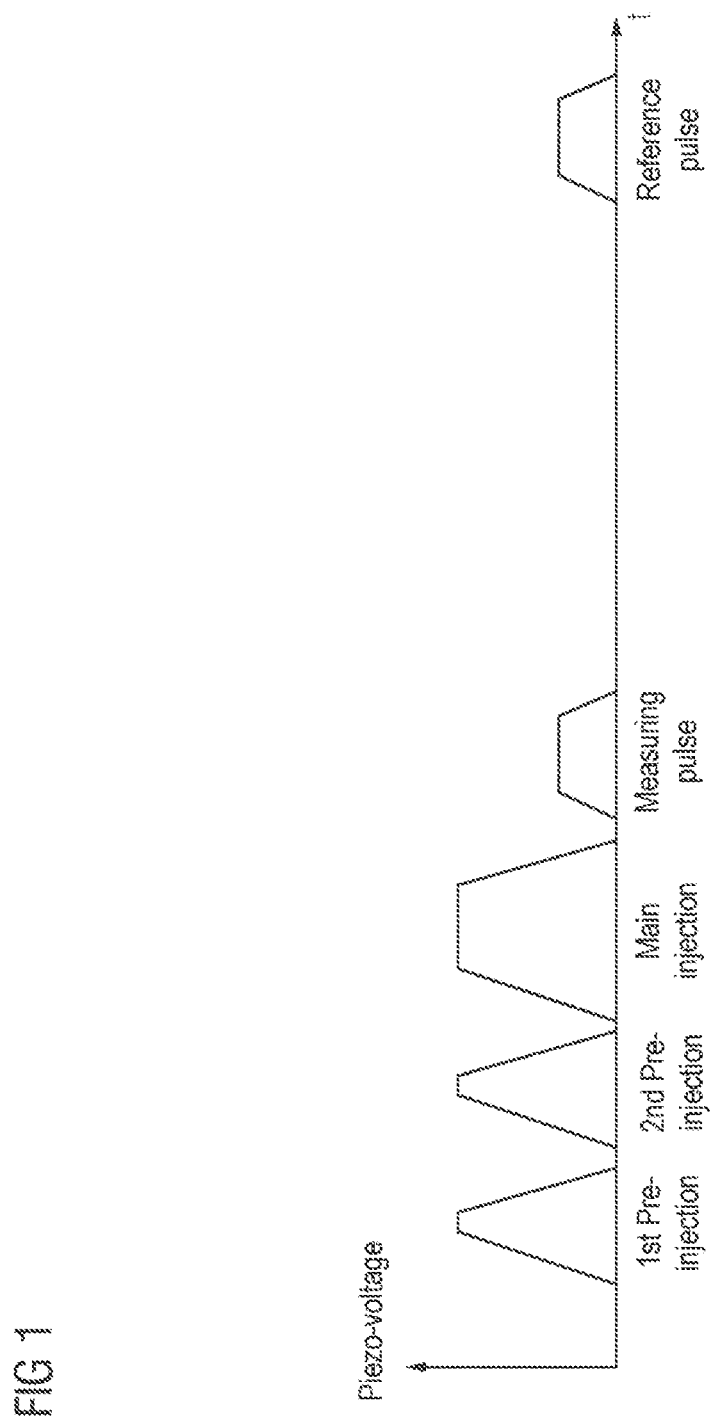
FIG. 1 shows in a diagram the piezo-voltage as a function of the time for a typical injection pattern with a measuring pulse and a reference pulse.

In a piezo-servo injector, the piezo-actuator is used to open a servo valve by means of the inverse piezo-electric effect, which in turn brings about, via the corresponding hydraulic coupling, opening of the nozzle needle and therefore injection of fuel. If the piezo-element is not used as an actuator, it is possible to use it as a force sensor by means of the direct piezo-electric effect. Specifically, in this context it is possible to detect the force acting on the servo valve, which force originates from the fuel pressure in the fuel chamber which is arranged under the servo valve when the piezo-actuator is in contact with the servo valve.

However, in a non-charged state, the piezo-actuator is not necessarily in contact with the servo valve. In this context, there is an air gap between the piezo-actuator and the servo valve. In order to carry out a measurement of force, the piezo-actuator must be charged to a certain degree to contact the servo valve. So that the piezo-actuator can act as a sensor, active charging of the piezo-actuator is therefore necessary. As a result, however, additional voltage oscillations are brought about at the actuator, which voltage oscillations reduce the signal-to-noise ratio of the sensor during the measurement of force. The amplitude of these voltage oscillations depends on a large number of factors, for example the manufacturing tolerances of the piezo-drive, the quantity of charge of the piezo-actuator or the temperature thereof. At any rate, the amplitude, frequency and phase of these oscillations can only be predicted with difficulty and vary from injector to injector and from operating point to operating point.

A noise component at specific frequencies which are far away from the frequencies which are present in the usable signal can be effectively eliminated by signal processing techniques. However, if significant noise components are present in a frequency range, which noise components cannot be removed, for example, by filtering, a low signal-to-noise ratio must be accepted, resulting ultimately in a lower level of accuracy of the measurement which is carried out.

In practice, injectors which have an excessively low signal-to-noise ratio have to be removed and discarded at the end of the production line for the injectors. Moreover, those piezo-elements of injectors which develop an excessively low signal-to-noise ratio over their service life lose their ability to act as sensors. This is detected by the corresponding control unit of the respective motor vehicle, which control unit indicates, via the corresponding on-board diagnostics, that this injector has to be replaced.

The teachings of the present disclosure may reduce the noise component of the signals measured by the piezo-actuator which operates as a sensor. Some embodiments of these teachings may include a method of the specified type which comprises:

Producing a measuring pulse at a position at which the usable signal which is to be measured is expected;

Then producing a reference pulse which corresponds to the measuring pulse, in the same cycle;

Subtracting the actuator voltage measured during the reference pulse from the actuator voltage measured during the measuring pulse; and Using the voltage signal difference as a usable signal for the measurement of force by the piezo-actuator which operates as a sensor.

In some embodiments, the usable signal which results from the measurement of force carried out by the sensor is therefore separated from the noise component which is produced by the partial charging of the piezo-actuator. Since the amplitude, frequency and phase of the oscillations produced by the partial charging can only be predicted with difficulty and vary from injector to injector and from operating point to operating point, a static correction cannot be carried out. Instead, the correction must be carried out individually for each injector.

The measuring pulse is produced at the location at which the usable signal is expected. For example, in this context, a main injection is followed directly by a measuring pulse with the objective of not influencing the injection itself but rather of measuring the piezo-voltage, in order, for example, to detect the closing of the nozzle needle during the main injection.

In some embodiments, after the production of the measuring pulse a reference pulse which corresponds to the measuring pulse is generated. A pulse which is identical to the measuring pulse can be generated a second time, and specifically at a later time in the same cycle if the force which acts on the piezo-actuator during the measurement remains stable, if, for example, the fuel pressure in the fuel chamber under the servo valve does not change and is at a rail pressure level, since the servo valve has already been closed sometime before. At this second pulse (reference pulse) the measured actuator voltage is composed only of the noise component which is induced by the partial charging of the piezo-actuator. The actuation parameters of this reference pulse are selected here such that they correspond to those of the measuring pulse, i.e. the charging current, charging time and time between the charging and discharging.

By subtracting the voltage signal recorded during the reference pulse from the voltage signal of the measuring pulse it is possible to reduce significantly the noise amplitude produced by the charging of the piezo-actuator, wherein the usable signal is not significantly affected, since it is present only in the measuring pulse.

The determined voltage difference is then used as a usable signal for the measurement of force by the piezo-actuator which operates as a sensor.

The corresponding limitations, which are caused by the noise component produced by the necessary partial charging of the piezo-actuator, are at least partially eliminated. The method according to the invention increases the signal-to-noise ratio in such systems significantly in that the noise component is measured in an independent fashion on a specific reference pulse and this result is subtracted from the measurement which is composed of a superimposition of the usable signal and of the noise component. In some embodiments, the piezo-actuator of an injector, in particular diesel servo injector, is used as a sensor independently of its sensitivity to noise oscillations which are caused by the partial charging with the piezo-actuator.

On the one hand, it is possible to reduce the rejection rate during the manufacture of injectors, since injectors which have a low signal-to-noise ratio do not have to be discarded. On the other hand, piezo-elements of injectors which develop an excessively low signal-to-noise ratio over their service life do not lose their ability to act as sensors. Generally, the increase in the signal-to-noise ratio which is brought about by the damping of the noise component caused by the charging results in more precise detection of the characteristic properties of the injector and is obtained for all injectors.

In some embodiments, the measuring pulse may be generated to produce a usable signal which represents the force or change in force acting on the servo valve as a result of the pressure or a change in the pressure in the fuel chamber. The corresponding force or change in force can therefore be measured significantly more accurately by means of the measured actuator voltage or measured change in actuator voltage, since the noise component is removed from the generated signal. In some embodiments, the signal correction which is carried out (subtraction of the noise component) is preferably adapted dynamically to the respective operating point.

In some embodiments, the method is used to detect the closing of the nozzle needle during a main injection. The corresponding measuring pulse is therefore generated to detect this event as a characteristic event of the injector. In some embodiments, digital signal processing may be carried out after the measurement which is carried out.

Some embodiments may include a motor vehicle which has a control unit which is designed to carry out the method described above.

FIG. 1 shows a diagram of a typical injection pattern with a measuring pulse and reference pulse. In this context, a first pre-injection, a second pre-injection, and a main injection are assumed. The measuring pulse is produced at a position at which the usable signal which is to be measured is expected. Then, a reference pulse which corresponds to the measuring pulse is produced.

Figure 2:
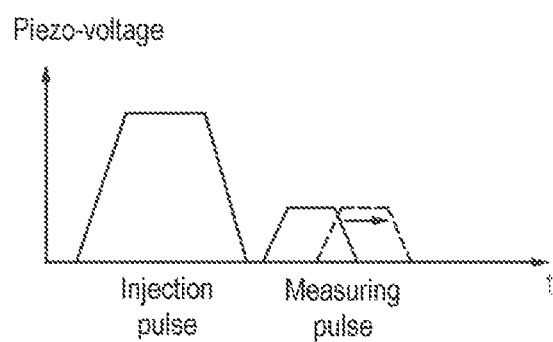
FIG. 2 shows a diagram corresponding to FIG. 1 with variation of the position of the measuring pulse.

FIG. 2 shows, in a corresponding diagram, the variation of the position of the measuring pulse.

Figure 3:
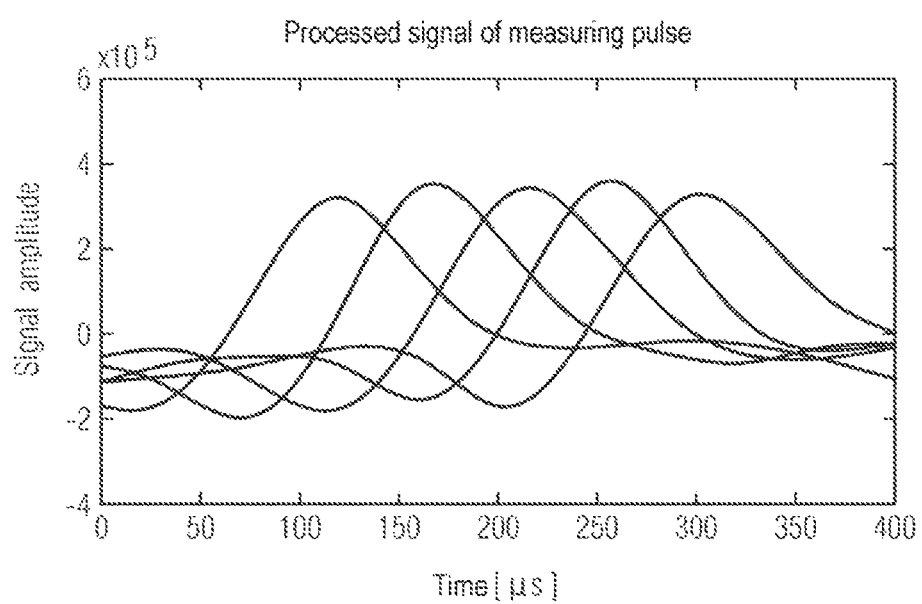
FIG. 3 shows a diagram of the signal amplitude as a function of the time, representing the processed signal of a measuring pulse of an injector with a high signal-to-noise ratio, wherein the different curves correspond to different positions of the measuring pulse.

FIG. 3 shows the processed signal of a measuring pulse of an injector with a high signal-to-noise ratio. The different curves relate to different positions of the measuring pulse (see also FIG. 2 in this respect).

This is an injector whose signal has only very little noise owing to the charging of the piezo-actuator. This can be discerned from the fact that the amplitude of the maximum (closing of needle) does not change to a large extent when the relative position of the measuring pulse is changed (changing of the phase relationship between the closing of the needle and the noise component induced by the charging).

Figure 4A:
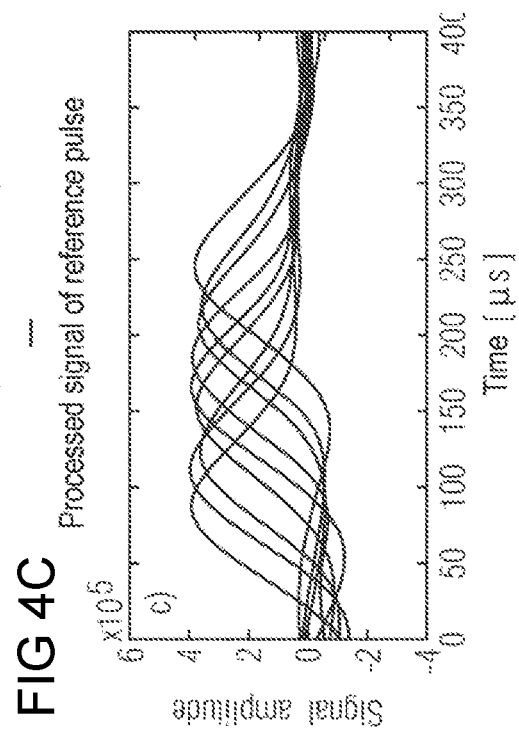
FIG. 4a shows a diagram corresponding to FIG. 3 which shows the processed signal of a measuring pulse of injector with a relatively low signal-to-noise ratio, wherein different curves represent different positions of the measuring pulse.

On the other hand, FIG. 4a shows corresponding curves for an injector with a significant noise component (even after the processing of the signal), which noise component is superimposed on the useful signal of the closing of the needle. This is apparent from the changing amplitude of the absolute maximum of the curves. In the curves shown in FIG. 4a, essentially one period of the corresponding noise spectrum is crossed (period length ~150 μs→noise frequency ~6.7 kHz).

Figure 4B:
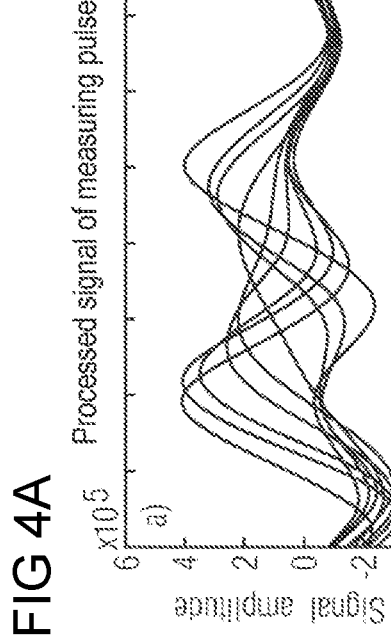
FIG. 4b shows a diagram corresponding to FIG. 4a which shows the processed signal of the reference pulse.
Figure 4C:
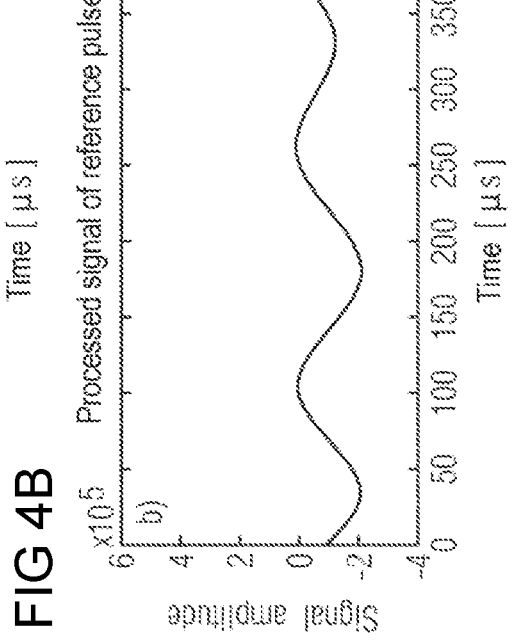
FIG. 4c shows a diagram corresponding to FIG. 4a and FIG. 4b which shows the processed signal of the difference between the measuring pulse and the reference pulse.

FIG. 4b shows the processed signal of the reference pulse for the example produced in FIG. 4a.

In FIGS. 3 and 4a-4c the zero point of the time axis refers to the end time of the charging process of the measuring pulse or reference pulse. The maximum of the curves shown, corresponding to the closing the needle, shifts, since the position of the measuring pulse shifts, but the position of the closing of the needle remains the same.

In some embodiments, the actuator voltage measured during the reference pulse is subtracted from the actuator voltage measured during the measuring pulse, and the voltage difference which is obtained is used as a usable signal for the measurement of force by the piezo-actuator which is operating a sensor. The corresponding signal difference is presented in FIG. 4c. The figure shows a much lower variation of the signal amplitude of the needle closing signal. The corresponding signal-to-noise ratio is comparable to that of an injector which essentially has no noise component, as illustrated in FIG. 3.

What is claimed is:

1. A method for operating a piezo-actuator in a piezo-operated injector for a fuel injection system, the method comprising:
   producing a measuring pulse at a position at which the usable signal which is to be measured is expected;
   then producing a reference pulse which corresponds to the measuring pulse, in the same cycle;
   subtracting a first actuator voltage measured during the reference pulse from a second actuator voltage measured during the measuring pulse;
   using a resulting voltage signal difference to calculate a force sensed by the piezo-actuator; and
   using the force sensed to correct an injection amount for the injector.

2. The method as claimed in claim 1, wherein the measuring pulse represents a force or a change in force acting on a servo valve in the fuel injector as a result of a pressure or a change in the pressure in a fuel chamber of the fuel injector.

3. The method as claimed in claim 1, further comprising dynamically adapting a signal correction based on a respective operating point.

4. The method as claimed in claim 1, wherein the measuring pulse is generated to detect closing of a nozzle needle during a main injection.

5. The method as claimed in claim 1, further comprising carrying out digital signal processing after the measurement.

6. A motor vehicle comprising:
   a fuel injection system; and
   a control unit programmed to:
   produce a measuring pulse at a position at which the usable signal which is to be measured is expected;
   then produce a reference pulse which corresponds to the measuring pulse, in the same cycle;
   subtract a first actuator voltage measured during the reference pulse from a second actuator voltage measured during the measuring pulse;
   use a resulting voltage signal difference to calculate a force sensed by the piezo-actuator; and
   use the force sensed to correct an injection amount for the injector.

* * * * *